Aug. 5, 1952  W. J. BOWAN ET AL  2,605,993
LUBRICATED VALVE
Filed Feb. 6, 1948

Inventors
Walter J. Bowan &
Frederick Tratzik
By Cushman, Darby & Cushman
Attorneys Patented Aug. 5, 1952

2,605,993

UNITED STATES PATENT OFFICE 2,605,993

LUBRICATED VALVE

Walter J. Bowan and Frederick Tratzik, Decatur, Ill., assignors to Mueller Co., Decatur, Ill., a corporation of Illinois Application February 6, 1948, Serial No. 6,666

3 Claims. (Cl. 251—93)

The present invention relates to lubricated valves. The application is a continuation-in-part of our application for Lubricated Valves, Serial No. 675,781, filed June 10, 1946, which has since been abandoned.

Objects of the invention are to provide a valve which includes an arrangement to automatically move lubricant to the seating surfaces, will provide an extremely efficient seal in a flow line under pressure, and which may be readily operated even when used with extremely high line pressures.

Other objects and advantages of the invention will be apparent from the following specification and accompanying drawings wherein.

Figure 1:
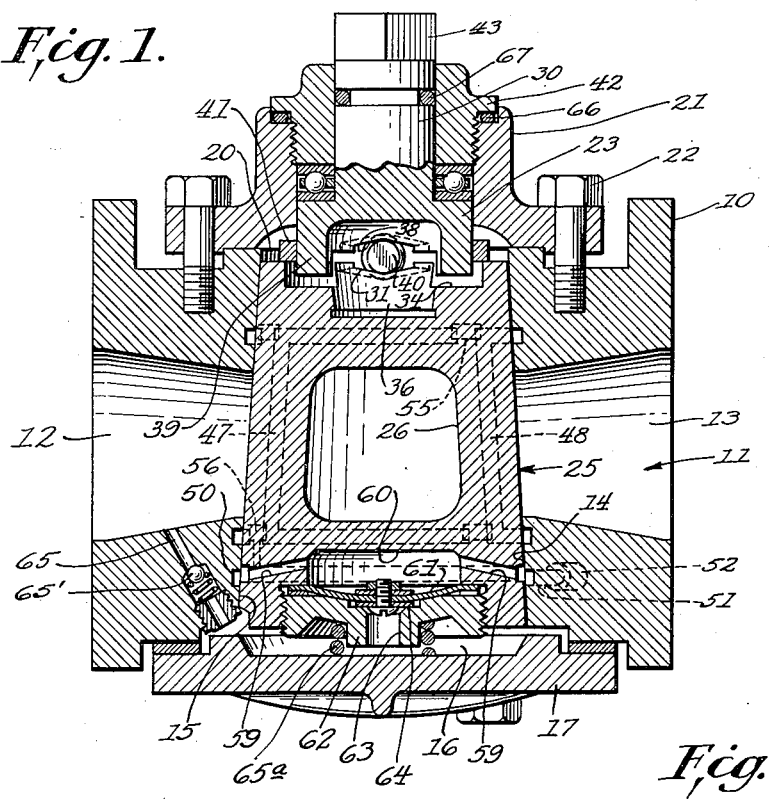
Figure 1 is an axial section through a valve of the present invention.

Referring to Figure 1, the numeral 10 designates the valve casing member which is provided with a flow passageway 11 including an inlet 12 and an outlet 13. A tapered valve seat bore 14 extends transversely of the flow passageway 11, the larger end 15 of the seat bore opening to a chamber 16 which is closed at its outer end by a plate or cap 17 secured in position by means of bolts. A gasket may be provided between the plate 17 and casing member. A stop block, not shown, may extend upwardly from the plate 17 to limit rotation of the valve plug or element through 90°.

The smaller end 20 of the seat bore 14 also extends through the casing member 10 but is closed by a bossed plate 21 secured to the casing by circumferentially spaced bolts 22. Plate 21 includes a bore 23 of a smaller diameter than the smaller end 20 of the seat bore 14.

A tapered plug 25 or valve member is mounted in the seat bore 14, the plug including a flow port 26. The smaller end of the plug 25 is so formed as to cooperate with a similar structure provided on the inner end of an operating stem 30. This arrangement, which causes the plug or valve element to initially move axially when any rotating force is applied thereto, is described in detail in the application of Walter J. Bowan and Frederick Tratzik, for Valves, Serial No. 611,465, filed August 20, 1945, which matured to Patent No. 2,510,494 on June 6, 1950. For the purpose of the present invention, this operating arrangement may be described as follows: The smaller end of the plug includes a pair of diametrically opposite and concentric concave cam surfaces 31 each of which is of V-shaped form. As shown in Figure 1, the cam surfaces 31 are inclined at an acute angle to a radius of the plug, with their point of greatest depth at the seating surface of the plug.

The cam surfaces 31 extend through an arc of somewhat less than 60° and, at their ends, have shoulders extending upwardly to the flat end surface of the plug. Midway between the cam surfaces 31, that end of the plug is provided with diametrically opposite recesses or pockets 34 which extend radially of the plug. The diametrically opposite cam surfaces 31 and the diametrically opposite recesses 34 are arranged about a circular line concentric with the plug axis.

The radially inner edges of the cams 31 may be defined by a central socket 36 in the plug. The end shoulders of the cam surfaces 31 and the end walls of the recesses 34 lie in planes which lie on the axis of the plug.

The operating stem or element 30 is equipped with two concave, arcuate and V-shaped cam surfaces 38, each of which will normally lie directly opposite the respective plug cam surface 31. As shown in Figure 1, two diametrically opposite projections 39 are integral with the stem 30, these projections and an adjacent cam surface 38 being spaced 90° so that a projection 39 will extend into each recess 34 of the plug. Each projection 39 includes a shoulder at each end thereof and these shoulders lie in planes which lie on the axis of the stem. As is explained in our above-mentioned application, the projections 39 are of a length circumferentially of the plug which is less than the corresponding dimension of the recesses 34. In this way, the projections 39 have a loose fit with respect to the recesses and circumferentially of the plug and operating element 30. A roller 40 is positioned between each pair of axially opposed cam surfaces 31 and 38, the rollers being of tapered formation to conform to the surfaces of the cams and rounded at their outer ends so that they will have a single point bearing upon the inner cylindrical surface of a holding ring 41 which fits about the inner end of the operating stem or element 30. The rollers 40 are held in proper position radially of the cam surfaces by the ring 41 and, because the rollers are tapered, no other securing means is required to maintain them in position.

As shown in Figure 1, the operating stem 30 is of reduced diameter at its outer end to provide an outwardly facing shoulder thereon within the bore 23 of bossed plate 21, and a roller bearing assembly is positioned between this shoulder and a retainer sleeve 42. Retainer sleeve 42 is threaded in the bore 23 of the plate 21 and, at its outer end, is provided with flat lateral surfaces, not shown, adapted to be engaged by a suitable wrench. Stem 30 extends outwardly beyond the sleeve 42 and may be squared as indicated at 43 to receive an operating handle or wrench. Sleeve 42 serves to hold stem 30 against outward movement.

Figure 2:
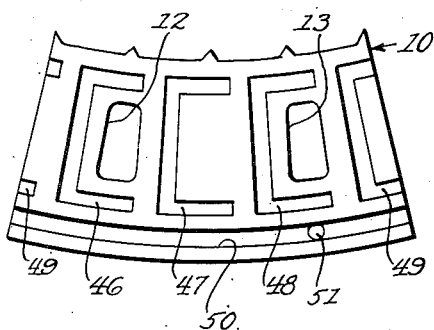
Figure 2 is a developed view of the valve casing member seating surface.

As best shown in Figure 2, the seating surface 14 of the valve casing member 10 is provided with four C-shaped grooves 46, 47, 48 and 49, respectively. The longitudinally extending portions of these grooves are spaced ninety degrees apart about the seating surface but the free ends of the circumferentially extending portions of each C-shaped groove are spaced from the longitudinal portion of the next adjacent C-shaped groove. It will be observed from Figure 2 that the grooves 46 and 48, respectively, enclose the inlet passage 12 and outlet passage 13, and that each passage is equidistantly spaced between the longitudinal portion of two grooves. A groove 50 extends circumferentially of the casing member seat between the larger end of the seat and the C-shaped grooves. A radial passage 51 extends from the groove 50 to a grease supply fitting chamber diagrammatically indicated at 52 in Figure 1.

Figure 3:
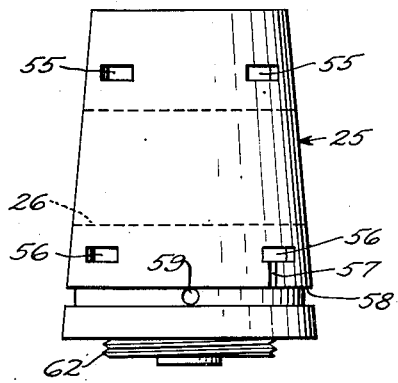
Figure 3 is an elevation of a valve plug.

As best shown in Figure 3, the valve plug 25 has four arcuate grooves 55 equidistantly spaced about its small end at a point between the small end of the plug and the flow port 26. These grooves are only of sufficient length circumferentially of the plug that they will bridge the corresponding ends of the C-shaped grooves when the plug is in either open or closed position. The large end of the plug 25 has four short arcuate grooves 56 equidistantly spaced thereabout at a point between the large end of the plug and the flow port 26. Two diametrically opposed short grooves 56 have ducts 57 extending therefrom to a circumferential groove 58 which encircles the plug 25 between the ducts 56 and the larger end of the plug. It will be observed from Figure 1 that the circumferential grooves 50 and 58 are of such width that they will overlap in any axial position of the plug.

As is best shown in Figure 1, two diametrical passages 59 lead from the plug groove 58 to the inner end portion of a chamber 60 within the plug. The chamber 60 is a cylindrical and centrally located recess opening to the larger end of the plug and is closed at its end nearest the large end of the plug by a flexible diaphragm or impulse member 61 secured at its perimeter by a threaded cap 62. Diaphragm 61 may be formed of rubber or leather. The cap 62 is provided with a central aperture 63 through which pressure in chamber 16 may act upon the diaphragm 61. At its central portion, the diaphragm is fitted with a metal plate 64 to contact with the edges of aperture 63 to prevent damage to the diaphragm.

In the operation of the above device, the plug will be held seated by line pressure flowing from the inlet passage 12 through a port 65 which opens to the chamber 16 at the larger end of the plug. A spring 65a positioned between cap 62 and plate 17 assists in holding the plug normally seated. A check valve 65' in port 65 prevents return flow of pressure from chamber 16 to inlet passage 12.

In use, the lubricating groove system will be filled with grease by a pressure gun connected to the grease fitting chamber 52, the grease then moving through the radial passage 51 to the opposed circumferential grooves 50 and 58. From the latter, the supply of grease will move through the radial passages 59 to the chamber 60. When the plug is in the closed position illustrated in Figure 1, or in full open position, grease will also move through the short passages 57 to the corresponding ducts 56 to fill the C-shaped grooves. Enough grease will be supplied through the grease fitting chamber 52 to entirely fill the groove system as well as the lubricant chamber 60 and thereby force diaphragm 61 to the distended position shown in Figure 1.

Flow line pressure moving past check valve 65' will act to hold plug 25 seated and will also urge diaphragm 61 upwardly, viewed with respect to Figure 1.

When the plug is to be operated, a suitable operating element will be fitted upon the outer end of the operating stem 30 to rotate the latter. As is described in our above-mentioned application, Serial No. 611,465, the initial rotation of the stem 30 will cause the plug to move axially so that it will be slightly unseated. When the plug has been sufficiently unseated to overcome resistance to turning, it will then rotate with the stem 30, generally by engagement of the lugs 39 with the side walls of the recesses 34. When the plug is moved axially as has just been described, the diaphragm 61 will be moved upwardly in chamber 60 as viewed in Figure 1 by reason of the pressure locked in chamber 16 acting upon the opposite surface of the diaphragm. This movement of the diaphragm with respect to the plug and chamber 60 will cause a high pressure to be exerted upon the lubricant in the chamber 60, thereby forcing additional lubricant to the seating surface of the valve. This additional lubricant will enable the plug to be more readily rotated and will also increase the supply of lubricant on the seating surfaces to thereby maintain these surfaces properly sealed.

Movement of lubricant from the chamber 60 by the axial movement of the plug just described naturally will result in a loss of lubricant from chamber 60. This will be compensated for by the continuing pressure on the outer surface of diaphragm 60. That is, when the plug again reaches an axial position such as approximated in Figure 1, the pressure acting on the outer surface of diaphragm 61 will force the diaphragm inwardly (or upwardly as viewed in Figure 1) thereby maintaining the lubricant in the entire system under proper pressure. As the diaphragm 61 moves inwardly, additional pressure will move from inlet line 12 through passage 65 and past check valve 65' so that a constant pressure is thereby exerted upon the lubricant. It eventually will be necessary to furnish additional lubricant to the chamber 60 through the grease gun fitting supporting chamber 52. However, large valves used in high pressure lines are not operated at frequent intervals and a long period of time may pass before the supply of lubricant in the chamber 60 is so reduced as to require replenishment through chamber 52.

In order to prevent leakage between the retainer sleeve 42 and the bossed plate 21, a packing ring 66 of the character described in our above-mentioned application, Serial No. 611,465, is provided between these two surfaces. Leakage along the stem 30 is prevented by a packing ring 67 corresponding to that described in said application. As is also explained in the above-mentioned application, the ring 66 is of such character that the retainer sleeve 42 may be slightly backed out to permit some play between the cams 38 and the rollers 40 so that the valve plug may be fully seated, all without permitting leakage past the packing 66.

The terminology used in the specification is for the purpose of description and not of limitation, the scope of the invention being defined in the claims.

We claim:

1. In a valve, a casing member provided with a flow passageway and a tapered seat bore, a ported and tapered valve member rotatably mounted in the seat bore, a lubricant chamber in the larger end of the valve and closed at its outer end by a diaphragm, a lubricant groove system in the seating surface of the valve communicating with the chamber interiorly of the diaphragm, means to unseat the valve member, and means to maintain a constant pressure on the exterior of the diaphragm to maintain the lubricant in the chamber under pressure, and comprising a passages in the casing member leading from a point exteriorly of the diaphragm to the flow passageway, and a check valve in said passage to prevent flow toward the flow passageway.

2. A valve of the character defined in claim 1 including means through which lubricant may be supplied to the lubricant chamber from the exterior of the casing member.

3. A valve of the character defined in claim 1 provided with means through which lubricant may be supplied to the lubricant chamber from the exterior of the casing member, said means including a groove extending circumferentially of the seating surface.

WALTER J. BOWAN.
FREDERICK TRATZIK.

REFERENCES CITED

The following references are of record in the file of this patent:

UNITED STATES PATENTS

| Number | Name | Date |
| --- | --- | --- |
| 1,400,647 | Westinghouse | Dec. 20, 1921 |
| 1,403,756 | Farmer | Jan. 17, 1922 |
| 1,671,603 | Nordstrom | May 29, 1928 |
| 2,321,233 | Mueller | June 8, 1943 |

FOREIGN PATENTS

| Number | Country | Date |
| --- | --- | --- |
| 256,098 | Great Britain | Aug. 5, 1926 |